US009207925B2

(12) United States Patent
Illg et al.

(10) Patent No.: US 9,207,925 B2
(45) Date of Patent: Dec. 8, 2015

(54) PLATFORM SPECIFIC PAYLOAD MANAGEMENT

(71) Applicant: International Business Machines Corporation, Armonk, NY (US)

(72) Inventors: Jason J. Illg, Eau Claire, WI (US); Leho Nigul, Ontario (CA); Patrick S. C. Tiu, Ontario (CA); Simon Wai, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 13/656,782

(22) Filed: Oct. 22, 2012

(65) Prior Publication Data

US 2013/0139150 A1 May 30, 2013

(30) Foreign Application Priority Data

Nov. 24, 2011 (CA) .................................... 2759461

(51) Int. Cl.
*G06F 9/445* (2006.01)

(52) U.S. Cl.
CPC .................................... *G06F 8/63* (2013.01)

(58) Field of Classification Search
None
See application file for complete search history.

(56) References Cited

U.S. PATENT DOCUMENTS 5,684,996 A 11/1997 Westerholm et al.
6,269,480 B1 7/2001 Curtis
7,246,351 B2 7/2007 Bloch et al.
7,493,614 B2 * 2/2009 Liu et al. ........................ 717/175
7,849,460 B1 12/2010 Martin et al.
8,171,470 B2 5/2012 Goldman et al.
8,191,060 B2 5/2012 Malasky et al.
8,245,216 B2 8/2012 Felts
8,418,226 B2 4/2013 Gardner
8,544,016 B2 * 9/2013 Friedman et al. ............. 718/104
2006/0272020 A1 11/2006 Gardner
2007/0113225 A1 5/2007 Felts
2008/0127169 A1 5/2008 Malasky et al.
2008/0127170 A1 5/2008 Goldman et al.
2008/0320473 A1 12/2008 Laska et al.

OTHER PUBLICATIONS

Prestwich, “Boise State Automated Cluster Installer Upgrade”, May 2009, 72 pages.
Bottaro et al., “Software Management of Heterogeneous Execution Platforms”, May 2009, 6 pages.

* cited by examiner

*Primary Examiner* — Chuck Kendall
(74) *Attorney, Agent, or Firm* — Yee & Associates, P.C.; Parashos Kalaitzis

(57) ABSTRACT

A computer-implemented method, program product and apparatus for platform specific payload management. The method receives a request containing an OS override value, calls a set of selection bundles using the OS override value and receives true for all selection bundles in the set of selection bundles applicable to the OS override value to form applicable selections and false for all selection bundles not applicable to the OS override value. The computer-implemented method further identifies OS specific payloads using the applicable selections, selects an OS specific payload as a deployable image from a repository, downloads the deployable image to a target system from the repository and unpacks the deployable image on the target system to form an installed image.

20 Claims, 5 Drawing Sheets

500

Start 502

Receive a request containing an OS override value 504

Call a set of selection bundles using the OS override value 506

Receive true for all selection bundles applicable to the OS override value to form applicable selections 508

Receive false for all selection bundles not applicable to the OS override value 510

Identify OS specific payloads using applicable selections 512

Determine whether OS specific payloads exist in a repository 514

No: Build OS specific payloads as deployable image using applicable selections 522

Store OS specific payloads as a deployable image in the repository 524

Yes: Select an OS specific payload as a deployable image from the repository 516

Download the deployable image to a target system from the repository 518

Unpack the deployable image on a target system to form an installed image 520

Perform post-install on the target system

End 526

CA920110055US1
Page 1 of 5

PLATFORM SPECIFIC PAYLOAD MANAGEMENT

BACKGROUND

1. Technical Field

This disclosure relates generally to product installation in a data processing system and more specifically to platform specific payload management in the data processing system.

2. Description of the Related Art

Typical installation technology in use stores all product payloads into a single repository. This storage aggregation serves well for cross platform, independent applications such as Java™ based applications, in which a large percentage of the product is operating system (OS) independent.

Installation management techniques, which use a heterogeneous repository of payloads typically, detect characteristics of a target platform of a user or requester and perform decisions using the information associated with the detected characteristics. A common process determines a target operating system, platform, and data storage bit targets for an installation to create an install package. For example, creating a Linux.x86.64.zip package representing a particular configuration for a Linux® operating system, x86 hardware, and a 64 bit installation; and in another example, creating an AIX.ppc.32 package representing a particular configuration for an AIX® operating system, PowerPC® hardware, and a 32 bit data storage installation.

The current technique accordingly requires products to support multiple different platform installation combinations in the form of predetermined combinations of operating system, hardware and data storage bit representations. While some products are installed using dedicated installers, other products use a generalized installer in the form of a user interface tool that has platform specific backend implications. In either case, platform specific installation tools and resources are required on a target system to perform and complete a product install on the target system with further additional post-install effort typically required.

SUMMARY

According to one embodiment, a computer-implemented process for platform specific payload management receives a request containing an OS override value, calls a set of selection bundles using the OS override value and receives true for all selection bundles in the set of selection bundles applicable to the OS override value to form applicable selections and false for all selection bundles not applicable to the OS override value. The computer-implemented process further identifies OS specific payloads using the applicable selections, selects an OS specific payload as a deployable image from a repository, downloads the deployable image to a target system from the repository and unpacks the deployable image on the target system to form an installed image.

According to another embodiment, a computer program product for platform specific payload management comprises a computer recordable-type media containing computer executable program code stored thereon. The computer executable program code comprises computer executable program code for receiving a request containing an OS override value, computer executable program code for calling a set of selection bundles using the OS override value, computer executable program code for receiving true for all selection bundles in the set of selection bundles applicable to the OS override value to form applicable selections, computer executable program code for receiving false for all selection bundles not applicable to the OS override value, computer executable program code for identifying OS specific payloads using the applicable selections, computer executable program code for selecting an OS specific payload as a deployable image from a repository, computer executable program code for downloading the deployable image to a target system from the repository and computer executable program code for unpacking the deployable image on the target system to form an installed image.

According to another embodiment, an apparatus for platform specific payload management comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive a request containing an OS override value, call a set of selection bundles using the OS override value, and receive true for all selection bundles in the set of selection bundles applicable to the OS override value to form applicable selections and false for all selection bundles not applicable to the OS override value. The processor unit executes the computer executable program code to further direct the apparatus to identify OS specific payloads using the applicable selections, select an OS specific payload as a deployable image from a repository, download the deployable image to a target system from the repository and unpack the deployable image on the target system to form an installed image.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
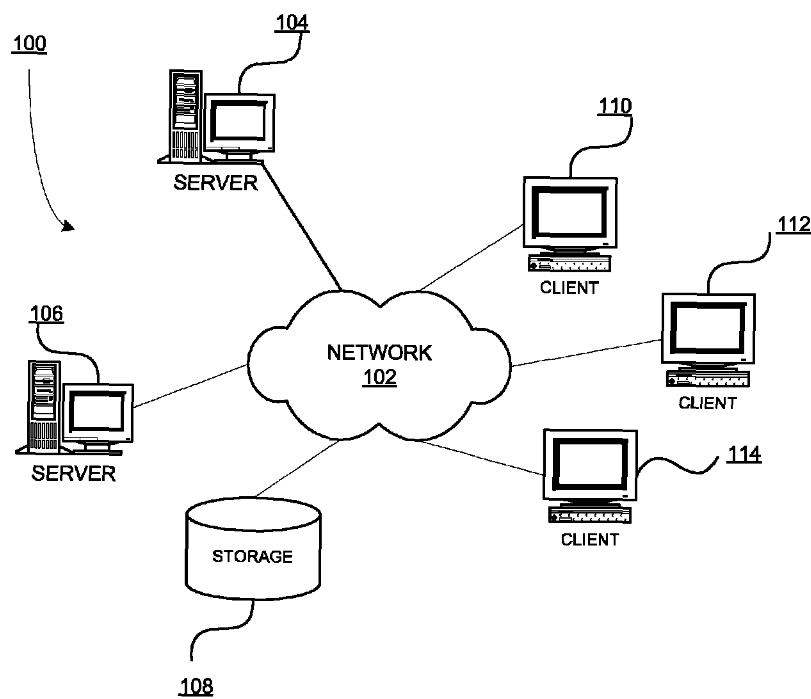
FIG. 1 is a pictorial representation of a network of data processing systems in which illustrative embodiments may be implemented.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
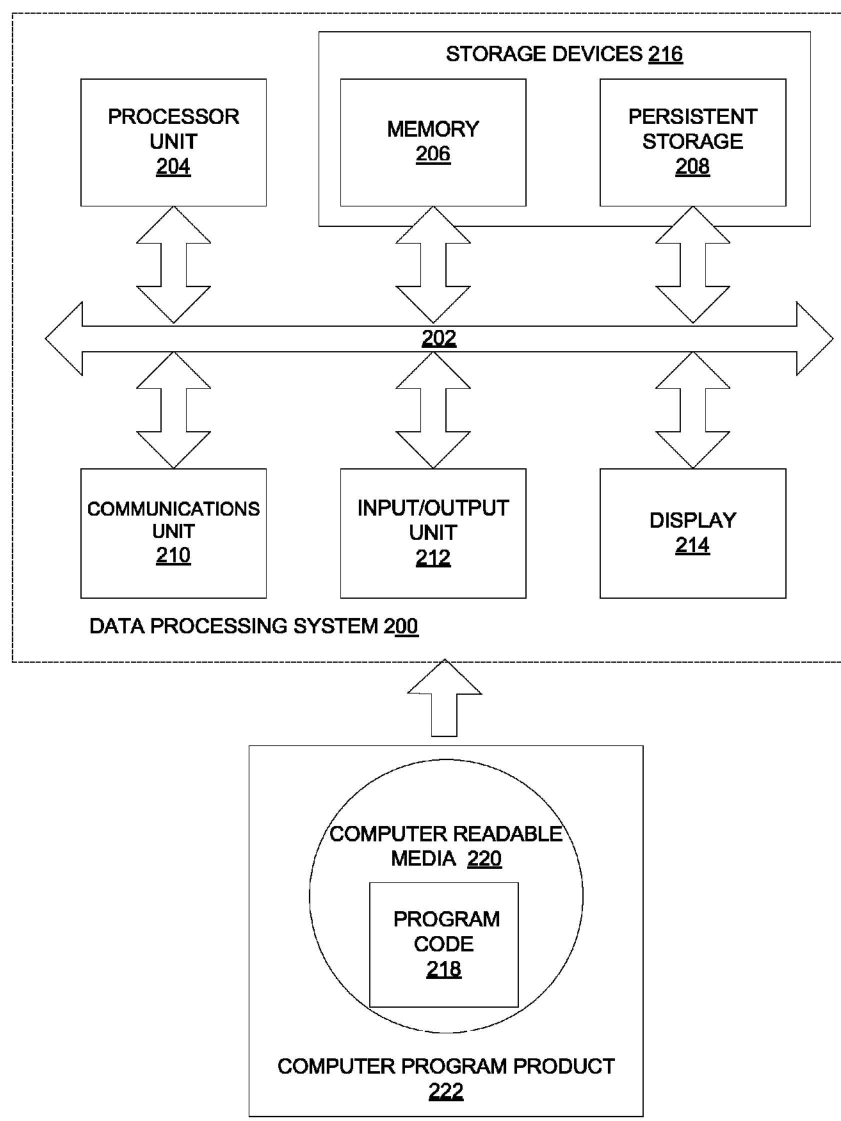
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for platform specific payload management using processor unit 204 receives a request containing an OS override value using communications unit 210, input/output unit 212 or through network 102 of network data processing system 100 of FIG. 1 and calls a set of selection bundles using the OS override value. Processor unit 204 receives true for all selection bundles in the set of selection bundles applicable to the OS override value to form applicable selections and false for all selection bundles not applicable to the OS override value. Processor unit 204 further identifies OS specific payloads using the applicable selections, selects an OS specific payload as a deployable image from a repository maintain using storage devices 216, downloads the deployable image to a target system, such as client 114 of network data processing system 100 of FIG. 1, from the repository and unpacks the deployable image on the target system to form an installed image.

In an alternative embodiment, program code 218 containing the computer-implemented process may be stored within computer readable media 220 as computer program product 222. In another illustrative embodiment, the process for platform specific payload management may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process of platform specific payload management.

Figure 3:
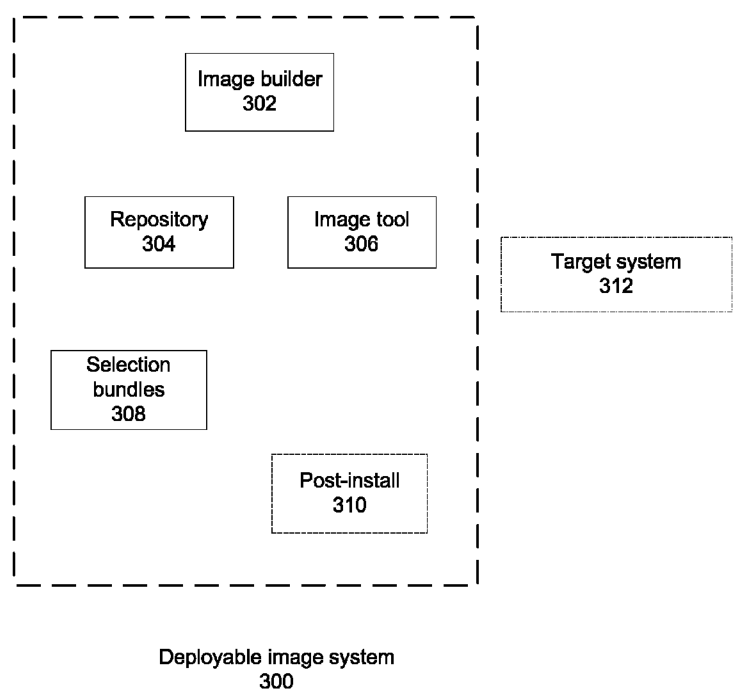
FIG. 3 is a block diagram of a deployable image system, in accordance with various embodiments of the disclosure.

With reference to FIG. 3, a block diagram of components of a deployable image system, in accordance with various embodiments of the disclosure, is presented. Deployable image system 300 is an illustrative embodiment of an example of a platform specific payload implementation management system, in accordance with the disclosure.

Deployable image system 300 leverages underlying support of a network data processing system such as network data processing 100 of FIG. 1. In an alternative embodiment as set of virtual systems implemented on a single data processing system such as data processing 200 of FIG. 2 may also be used.

Deployable image system 300 comprises a number of components including image builder 302, repository 304, image tool 306, selection bundles 308, post-install 310 and target system 312. Post-install 310 is an optional component in that post-install operations are typically performed on the target system after an image has been implemented on the target system 312. However, when standard install operations or features are available, an additional package can be added within or along with the deployable image. For example, the additional package can be added within, or along with, the deployable image in the form of an executable script or executable to run upon completion of the deployable image implementation on a target system.

Target system 312 is shown outside deployable image system 300 because a target system is not part of deployable image system 300 per se. Target system 312 is a receiver system on which a requested deployable image is implemented or unpacked, or decompressed, or made operational (all equivalent terms in this example).

Image builder 302 provides a capability to create deployable images, suitable for use on a number of specific target platforms using a set of selection criteria. Image builder 302, responsive to a set of the chosen selection criteria, gathers bundles together to create a specific target system usable image. An image may comprise an operating system, an application or a set comprising a combination of a specified operating system and applications or a set comprising a specified set of applications. Image builder 302 builds a deployable image using techniques including assembly, compilation and integration to form desired ready to run product images. Deployable images are typically a set of executable instructions in a compressed form suitable for transmission over a network and decompression on a target system in the network or in a virtual system within a system wherein the network is internal to the system.

A deployable image in a repository may be analogous to a book in store in that a book on the shelf is already printed and ready for use. The book may be wrapped in a protective wrapping awaiting selection and unwrapping by a reader. In a similar manner, a deployable image is ready to use on a target system without typical installation processing. Just as in the book analogy, the deployable image requires unwrapping for use, however in this case the deployable image is unpacked or decompressed for use on the target system without need of a platform or environment specific installer and install procedure.

Repository 304 is a data structure maintained by deployable image system 300 (or optionally another tool including a database system), in which deployable images created by image builder 302 are stored for selectable deployment. For example, repository 304 may be implemented in a suitable file system or a database management system enabling addition, modification, deletion and selective transmission of the deployable image content. Repository 304 may also be viewed as a homogeneous repository in that the contents comprise a number of differing offerings arranged according to operating system type. For example, a database table may contain stored deployable images for offerings related to a single generic operating system arranged by hardware platform to aid in product management and selection for transmission.

Image tool 306 provides a user interface and process control capability for deployable image system 300. Image tool 306 enables a requester, in the form of a user or an automated process, to request selection and transmission of a deployable image located in repository 304. Image tool 306 manages interaction between the requester and the build, store, retrieve and send operations of deployable image system 300.

Selection bundles 308 provide a capability of indicating (or identifying) which features or characteristics are required of a desired image given an operating system specific input value. Bundles represent a logical collection of executable code or logic comprising one or more elements to form the bundle. The bundle may be formed of logical entities including a set of code or collection of functions or a single functional element. Selection bundles 308 provide a capability of a selector by receiving an input value in a request using image tool 306 specifying a selection criteria referred to as an operating system override. The selection criteria comprises properties including operating system, hardware platform, data storage and processing bit representation as well as other characteristics necessary to identify an operating environment in which the deployable image is destined to function, including additional software combinations including requisite software components such as product features or support elements.

Post-install 310, shown in dashed format, represents an optional capability providing customization after a deployable image has been implemented on a target system. For example, a post-install may represent a series of operations necessary to link elements of an implemented deployable image with previously installed or subsequently installed components such as a database management system or network configuration.

Target system 312, shown in dashed format, represents an external system on which a deployable image is to be implemented. Implementation arises from a selected deployable image being received at target system 312 and comprises an accepting, unpacking, decompressing, or making operational (equivalent terms as used in this example). A conventional installation process is not required on the target system when using a deployable image in accordance with an embodiment of the disclosed process because the deployable image is ready to run when accepted, unpacked, decompressed, or made operational on the target system.

Figure 4:
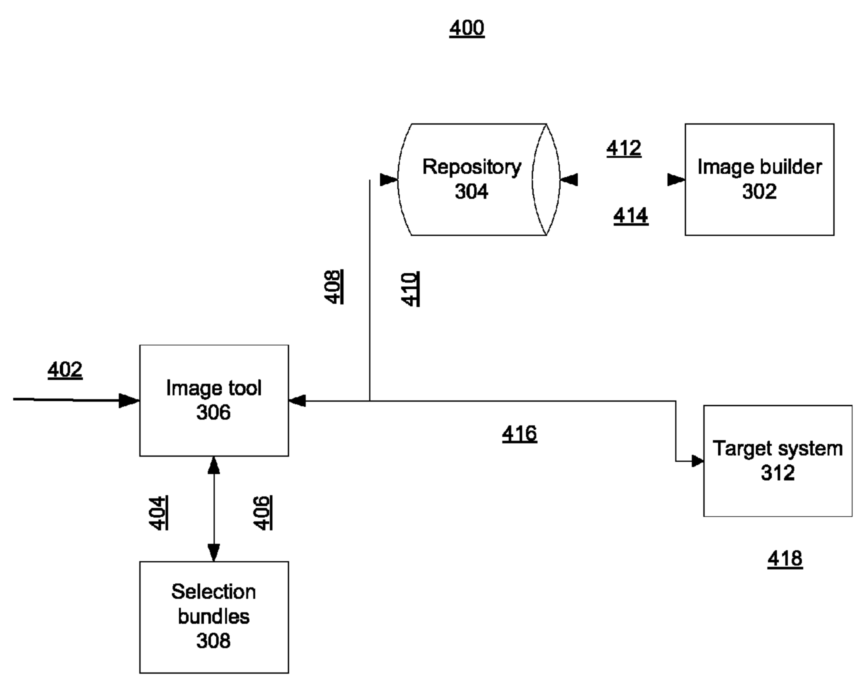
FIG. 4 is a block diagram of a data flow using the deployable image system of FIG. 3, in accordance with one embodiment of the disclosure.

With reference to FIG. 4, a block diagram of a data flow using the deployable image system of FIG. 3, in accordance with one embodiment of the disclosure, is presented. Data flow 400 represents an example of a set of logical data flow operations among components of deployable image system 300 of FIG. 3.

Flow 402 represents a request arriving at image tool 306 of FIG. 3 to initiate processing. Image tool 306 receives the request and initiates a search using flow 404 among selection bundles 308 of FIG. 3. Image tool 306 receives the results of the search in the form of identified selection bundles using flow 406.

The identified selection bundles are passed from image tool 306 to repository 304 of FIG. 3 using flow 408. An identified deployable image matching criteria established in the selection bundles is returned to image tool 306 using flow 410. When a matching deployable image cannot be located within repository 304, flow 412 is used to initiate a request of image builder 302 of FIG. 3 to create the desired deployable image. Having created a deployable image, flow 414 sends the deployable image for storage in repository 304.

Transmission of a selected deployable image from repository 304 to target system 312 of FIG. 3 using image tool 306 occurs using flow 416. The transmission may be direct from the repository or indirectly through the image tool as desired. Operation 418 represents an optional post-install operation performed on target system 312.

Figure 5:
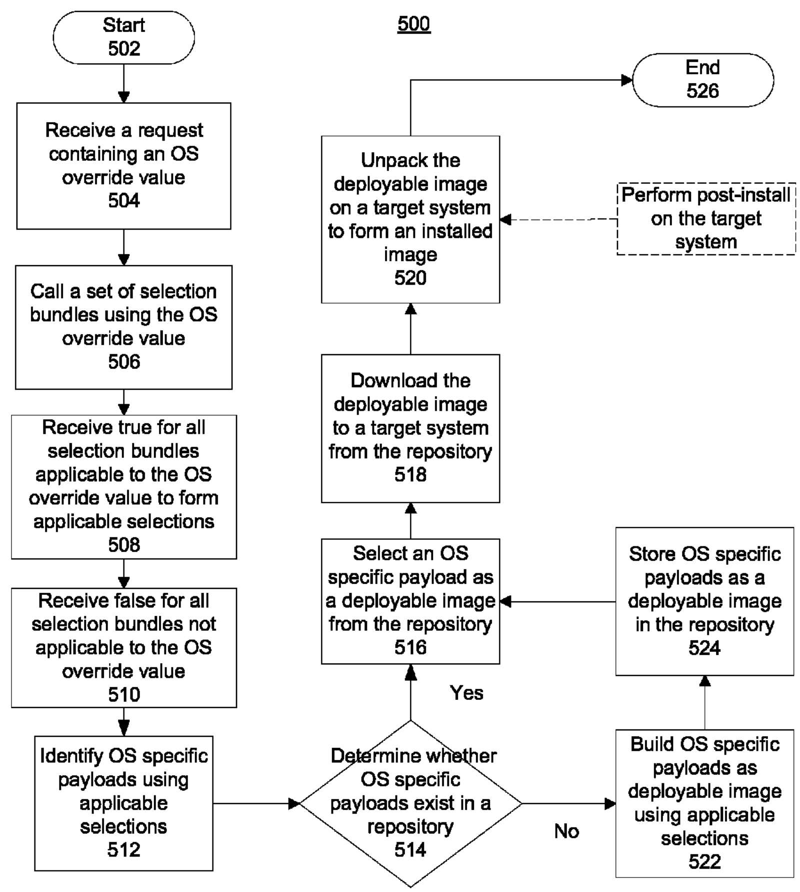
FIG. 5 is a flowchart of a process using the deployable image system of FIG. 3, in accordance with one embodiment of the disclosure.

With reference to FIG. 5, a flowchart of a process using the deployable image system of FIG. 3, in accordance with one embodiment of the disclosure, is presented.
Process 500 is an example of a process for programmatic creation of platform specific payload in a homogeneous environment using deployable image system 300 of FIG. 3.

The ability to decompress products rather than install the products is useful in many ways. The disclosed technique is typically needed anytime a homogeneous repository targets heterogeneous operating systems and relies on an installation governing body for detection. In other words, a user can decompress a product onto a location without the overhead of installing, or whatever other specific install programs are needed for the product. The disclosed process also typically reduces the effort required because installation programs typically need specific system libraries, resource package management offerings (rpms), or settings which a user may not want to establish for a product, but which must typically be established for installation of the product.

Using the disclosed process typically enables a single specific platform to create a number of required, but different, specific images. The compressed deployable image is not only useful to embedding products but typically eliminates a need for a target system to have the necessary setup and power to run a prescribed installation tool (for example, an installation manager, in graphical user interface mode, usually requires a specific set of libraries).

Process 500 begins (step 502) and receives a request containing an operating system (OS) override value (step 504). For example a user (or programmatic mechanism) sets an OSOverride value to aix.ppc.32. Process 500, typically through an installation tool, calls a set of associated OS selection bundles using the OSOverride value (step 506).

Process 500, using the selection bundles to detect the override, receives a value of TRUE for all selection bundles that apply the OSOverride value to form applicable selections, in this example to aix.ppc.32 (step 508). For example, when there are AIX, AIX.PPC, and AIX.PPC.32 selection bundles present all such selection bundles return TRUE. Using the example, a sub-string check is performed for an AIX selection bundle, and for AIX.PPC selections. A direct match is needed for the OSOverride value of AIX.PPC.32.

Process 500 receives from all other selection bundles detecting the OSOverride value that was sent and not part of that OSOverride value a return value of FALSE (step 510). Using this technique enables tricking the correct OS selection bundle into returning FALSE. The trick enables process 500 to correctly obtain a desired deployable image regardless of the platform on which process 500 executes. For example, process 500 typically executes on a platform for which a deployable image is desired.

Process 500 identifies OS specific payloads using the applicable selections (step 512). Selection bundles in override mode cause process 500 to determine whether the OS specific payload exists in a repository (step 514). For example, the repository may be a homogeneous repository such as repository 304 of deployable image system 300 of FIG. 3.

Responsive to a determination that the OS specific payload exists in a repository, for selection bundles with a value of TRUE, process 500 selects an associated OS specific payload as a deployable image from the repository (step 516). Process 500 downloads the selected deployable image to a target system from the repository (step 518). Process 500 unpacks the selected deployable image onto the target system to form an installed image (step 520) and terminates thereafter (step 526). As stated previously, the target system is typically where the installation tool in one embodiment of process 500 is running. As per process 500, any post installation actions are not executed on a target system. However, in the event post installation actions are standardized, such actions may optionally be incorporated into a deployable image and performed in conjunction with the unpacking of the selected deployable image onto the target system to form an installed image. Typically a requester decompresses or unpacks the deployable image, and executes any post-install actions.

Responsive to a determination that the OS specific payload does not exist in a repository, process 500 builds OS specific payloads as deployable images using the applicable selections (step 522). Process 500 further stores the OS specific payloads as deployable images in the repository (step 524) and returns to step 516.

Thus is presented, in one embodiment, a computer-implemented process for platform specific payload management. The computer-implemented process receives a request containing an OS override value, calls a set of selection bundles using the OS override value and receives true for all selection bundles in the set of selection bundles applicable to the OS override value to form applicable selections and false for all selection bundles not applicable to the OS override value. The computer-implemented process further identifies OS specific payloads using the applicable selections, selects an OS specific payload as a deployable image from a repository, downloads the deployable image to a target system from the repository and unpacks the deployable image on the target system to form an installed image.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for platform specific payload management using a repository of heterogeneous payloads, the method comprising steps performed by a computer of:

receiving a request containing an operating system (OS) selection criteria specifying a particular operation system to be deployed on a target system;

responsive to receiving the request, calling a set of selection bundles using the OS selection criteria;

responsive to calling the set of selection bundles using the OS selection criteria, identifying, by at least one selection bundle of the set of selection bundles, identified selection bundles of the set of selection bundles based on the OS selection criteria;

responsive to identifying the identified selection bundles by the at least one selection bundle of the set of selection bundles, selecting at least one OS specific payload as a deployable image from the repository using the identified selection bundles;

responsive to selecting the at least one OS specific payload, downloading the deployable image across a network to the target system; and unpacking the deployable image on the target system to form an installed operating system image that is usable as an operating system on the target system without subsequent installation processing.

2. The method of claim 1 wherein selecting at least one OS specific payload as a deployable image from the repository further comprises:

determining whether the at least one OS specific payload exists in the repository; and responsive to a determination that the at least one OS specific payload exists in the repository, selecting the at least one OS specific payload as the deployable image from the repository.

3. The method of claim 1 wherein identifying identified selection bundles of the set of selection bundles based on the OS selection criteria further comprises:

receiving true for all selection bundles in the set of selection bundles applicable to the OS selection criteria;

receiving false for all selection bundles in the set of selection bundles not applicable to the OS selection criteria; and causing a native OS selection bundle to return a value of false, wherein the native OS is on a platform calling the set of selection bundles using the OS selection criteria.

4. The method of claim 1 wherein identifying identified selection bundles of the set of selection bundles based on the OS selection criteria further comprises:

obtaining a direct match of the OS selection criteria for all applicable selection bundles.

5. The method of claim 2 further comprising:

responsive to a determination that the at least one OS specific payload does not exist in the repository, building OS specific payloads as a deployable image using the identified selection bundles and storing the OS specific payloads in the repository.

6. The method of claim 1 wherein unpacking the deployable image on the target system to form an installed image further comprises an operation selected from a set of operations including decompressing, unzipping and making ready for use.

7. The method of claim 1 wherein downloading the deployable image to a target system from the repository further comprises inclusion of a post-install sequence of operations associated with the deployable image, wherein the post-install sequence of operations is executable on the target system.

8. A computer program product for platform specific payload management using a repository of heterogeneous payloads, the computer program product comprising:

a computer recordable-type storage media containing computer executable program code stored thereon, the computer executable program code comprising:

computer executable program code for receiving a request containing an operating system (OS) selection criteria specifying a particular operation system to be deployed on a target system;

computer executable program code for, responsive to receiving the request, calling a set of selection bundles using the OS selection criteria;

computer executable program code for, responsive to calling the set of selection bundles using the OS selection criteria, identifying identified selection bundles of the set of selection bundles based on the OS selection criteria;

computer executable program code for, responsive to identifying the identified selection bundles by the at least one selection bundle of the set of selection bundles, selecting at least one OS specific payload as a deployable image from the repository using the identified selection bundles;

computer executable program code for, responsive to selecting the at least one OS specific payload, downloading the deployable image across a network to the target system; and computer executable program code for unpacking the deployable image on the target system to form an installed operating system image that is usable as an operating system on the target system without subsequent installation processing.

9. The computer program product of claim 8 wherein computer executable program code for selecting at least one OS specific payload as a deployable image from a repository further comprises:

computer executable program code for determining whether the at least one OS specific payload exists in the repository; and computer executable program code, responsive to a determination that the OS specific payloads exist in the repository, for selecting the at least one OS specific payload as a deployable image from the repository.

10. The computer program product of claim 8 wherein computer executable program code for identifying identified selection bundles of the set of selection bundles based on the OS selection criteria further comprises:

computer executable program code for receiving true for all selection bundles in the set of selection bundles applicable to the OS selection criteria;

computer executable program code for receiving false for all selection bundles in the set of selection bundles not applicable to the OS selection criteria; and computer executable program code for causing a native OS selection bundle to return a value of false, wherein the native OS is on a platform calling the set of selection bundles using the OS selection criteria.

11. The computer program product of claim 8 wherein computer executable program code for identifying identified selection bundles of the set of selection bundles based on the OS selection criteria further comprises:

computer executable program code for obtaining a direct match of the OS selection criteria for all applicable selection bundles.

12. The computer program product of claim 9 further comprising computer executable program code, responsive to a determination that the at least one OS specific payload does not exist in the repository, for building OS specific payloads as a deployable image using the identified selection bundles and storing the OS specific payloads in the repository.

13. The computer program product of claim 8 wherein computer executable program code for unpacking the deployable image on the target system to form an installed image further comprises computer executable program code for an operation selected from a set of operations including decompressing, unzipping and making ready for use.

14. The computer program product of claim 8 wherein computer executable program code for downloading the deployable image to a target system from the repository further comprises computer executable program code for inclusion of a post-install sequence of operations associated with the deployable image, wherein the post-install sequence of operations is executable on the target system.

15. An apparatus for platform specific payload management using a repository of heterogeneous payloads, the apparatus comprising:

a communications fabric;

a memory connected to the communications fabric, wherein the memory contains computer executable program code;

a communications unit connected to the communications fabric;

an input/output unit connected to the communications fabric;

a display connected to the communications fabric; and a processor unit connected to the communications fabric, wherein the processor unit executes the computer executable program code to direct the apparatus to:

receive a request containing an operating system (OS) selection criteria specifying a particular operation system to be deployed on a target system;

responsive to receiving the request, call a set of selection bundles using the OS selection criteria;

responsive to calling the set of selection bundles using the OS selection criteria, identify identified selection bundles of the set of selection bundles based on the OS selection criteria;

responsive to identifying the identified selection bundles by the at least one selection bundle of the set of selection bundles, select at least one OS specific payload as a deployable image from the repository using the identified selection bundles;

responsive to selecting the at least one OS specific payload, download the deployable image across a network to the target system; and unpack the deployable image on the target system to form an installed operating system image that is usable as an operating system on the target system without subsequent installation processing.

16. The apparatus of claim 15 wherein the processor unit executes the computer executable program code to select at least one OS specific payload as a deployable image from a repository further directs the apparatus to:

determine whether the at least one OS specific payload exists in the repository; and responsive to a determination that the at least one OS specific payload exists in the repository, select the at least one OS specific payload as a deployable image from the repository.

17. The apparatus of claim 15 wherein the processor unit executes the computer executable program code to identify identified selection bundles of the set of selection bundles based on the OS selection criteria further directs the apparatus to:

receive true for all selection bundles in the set of selection bundles applicable to the OS selection criteria;

receive false for all selection bundles in the set of selection bundles not applicable to the OS selection criteria; and cause a native OS selection bundle to return a value of false, wherein the native OS is on a platform calling the set of selection bundles using the OS selection criteria.

18. The apparatus of claim 15 wherein the processor unit executes the computer executable program code to identify identified selection bundles of the set of selection bundles based on the OS selection criteria further directs the apparatus to:

obtain a direct match of the OS selection criteria for all applicable selection bundles.

19. The apparatus of claim 16 wherein the processor unit executes the computer executable program code, responsive to a determination that the at least one OS specific payload does not exist in the repository, to further direct the apparatus to build OS specific payloads as a deployable image using the identified selection bundles and store the OS specific payloads in the repository.

20. The apparatus of claim 15 wherein the processor unit executes the computer executable program code to unpack the deployable image on the target system to form an installed image further directs the apparatus to perform an operation selected from a set of operations including decompressing, unzipping and making ready for use.

* * * * *